United States Patent [19]

Kahn

[11] 3,786,457

[45] Jan. 15, 1974

[54] DISK RECORDER ARM ASSEMBLY MOUNT

[75] Inventor: Michael E. Kahn, Palo Alto, Calif.

[73] Assignee: Memorex Corporation, Santa Clara, Calif.

[22] Filed: Oct. 24, 1972

[21] Appl. No.: 300,276

[52] U.S. Cl. .......... 340/174.1 C

[51] Int. Cl. .......... G11b 5/48

[58] Field of Search .......... 340/174.1; 346/137

[56] References Cited

UNITED STATES PATENTS 3,713,121 1/1973 Fasano .......... 340/174.1 E

*Primary Examiner*—Vincent P. Canney

*Attorney*—Karl A. Limbach et al.

[57] ABSTRACT

A rigid mount for a leaf spring loaded arm assembly cantilevered from the mount, the mount has a central contact point against which a leaf spring is loaded to localize the contact interface between the mount and leaf spring and prevent undesirable resonances from developing in the arm assembly caused in part by the otherwise shifting interface between a flat mounting surface and an anticlastically curved leaf spring surface developed on bending the leaf spring when the arm assembly is loaded onto a rotating recording disk.

4 Claims, 4 Drawing Figures

DISK RECORDER ARM ASSEMBLY MOUNT

BACKGROUND OF THE INVENTION

In the art of information storage and retrieval on magnetic recording disks, a recording transducer is commonly supported over a high speed rotating disk and positioned to read or record information in a plurality of concentric tracks on the disk. The arrangement of a rotating disk and independently supported transducer enables the disk to be randomly accessed for rapid information retrieval or transferal. One preferred method of supporting a recording transducer on a recording surface is by the use of an elongated cantilevered member which is attached to an accessing carriage arranged for reciprocal linear movement relative to the axis of the disk. The recording transducer is mounted to the distal or free end of the cantilevered member and is arranged to float or fly on an air cushion created by the rapid rotation of the disk. To achieve a uniform flight over the disk and hence uniform recording characteristics, the transducer must have means to enable it to conform to physical imperfections in the surface of the disk. In this respect the transducer is retained in an aerodynamic shoe which is supported on the cantilevered structure by a gimbal or flexible mount.

Various methods of loading the transducer on the recording disk have been devised including the provision of a ramp on a pre-biased arm which in cooperation with a stationary cam permits the transducer to be displaced to the surface of the disk when the arm is moved toward the axis of the disk. On loading a transducer on a recording disk with bias from a flat leaf spring connected to the cantilevered arm, certain problems arise from a phenomenon known as anticlastic curvature. In bending a flat leaf spring an oppositely directed curvature is generated transverse to the curvature of the bend. A leaf spring fixed to the end of a cantilevered member and attached to a rigid mount when deformed generates a curvature across the surface of the mount. The curvature allows the contact point between the leaf spring and mount to drift in response to torsional forces on the arm.

A rotating disk, which rotates at the high speeds necessary for high density recording, develops resonant vibrations which are difficult if not impossible to wholly suppress. A transducer slider riding on an air layer over the surface of the disk also generates vibrations which are transmitted to the arm assembly. The resonant vibrations of the arm assembly are in part determined by the position of the contact point between the leaf spring and mount, and the contact point between the slider and cantilevered arm. When the contact point is allowed to drift, the resonant vibrations of the disk are more readily able to induce a consonant resonant vibration in the arm than were the contact point localized. A principal object of the invention is to provide a means for preventing undesirable resonances between the arm assembly and the disk from arising.

An additional object is to provide a means for restricting twist in a cam-ramp type of unloading where the arm is cammed along its longitudinal edge when retracted from the disk. It is therefore a secondary object of this invention to provide means for restricting this deformation.

SUMMARY OF THE INVENTION

The invention comprises an improved rigid mount for a leaf spring type arm assembly for supporting a recording transducer over the surface of a recording disk in a disk storage machine. The rigid mount supports the arm assembly which is cantilevered from the mount by a leaf spring and connects the arm assembly to an accessing mechanism for linear reciprocal movement of the transducer normal to the axis of a rotating disk. The improved mount of this invention operates in combination with an elongated leaf spring projecting from the end of an arm assembly and prevents undesirable resonant vibrations from developing in the arm assembly by localizing the initial contact point between the leaf spring and mount. The mount comprises a rigid member having a substantially flat face against which the elongated leaf spring of the arm assembly is secured such that the arm assembly is effectively cantilevered from one end of the mount by the leaf spring. At the line of cantilever on the end edge of the mount where the leaf spring makes initial contact with the mount, the face of the mount is routed save for a narrow ridge substantially at the center of the edge of the mount. The line of cantilever is thus essentially altered to a point of cantilever. The point of cantilever is preferrably selected to lie on the dynamic centroidal axis of the arm when the arm assembly is loaded on a disk. Centroidal in this sense is used to define the axis about which the dynamic moments are balanced during ideal operation. When the leaf spring is deformed by loading a transducer onto a disk, the anticlastic curvature will be unable to shift the initial point of contact between spring and mount since the contact point is restricted to the ridge on the edge of the mount.

When a cam-ramp type of loading, used to load the arm assembly and transducer on the disk, operates on the edge of the arm assembly, means must be provided on the mount to limit the twist of the arm assembly when the assembly is retracted and loaded at its edge on a stationary cam. When the mount is improved to provide a single contact point by the use of a centrally positioned elevated ridge, the ridge effectively becomes a pivot for the unusual torsion caused by the edge support of the arm when unloaded. To restrict excessive twisting caused by this torsion a second ridge is included on the end edge of the mount displaced from the first ridge and located at the corner of the mount along the same side on which the arm assembly is cammed. This second ridge forms a simple stop and in no way interfers with the function or performance of the first ridge since during loading the anticlastic curvature of the spring raises the edge of the spring above the second ridge.

DETAILED DESCRIPTION OF THE PREFERRED EMBODIMENT

Figure 1:
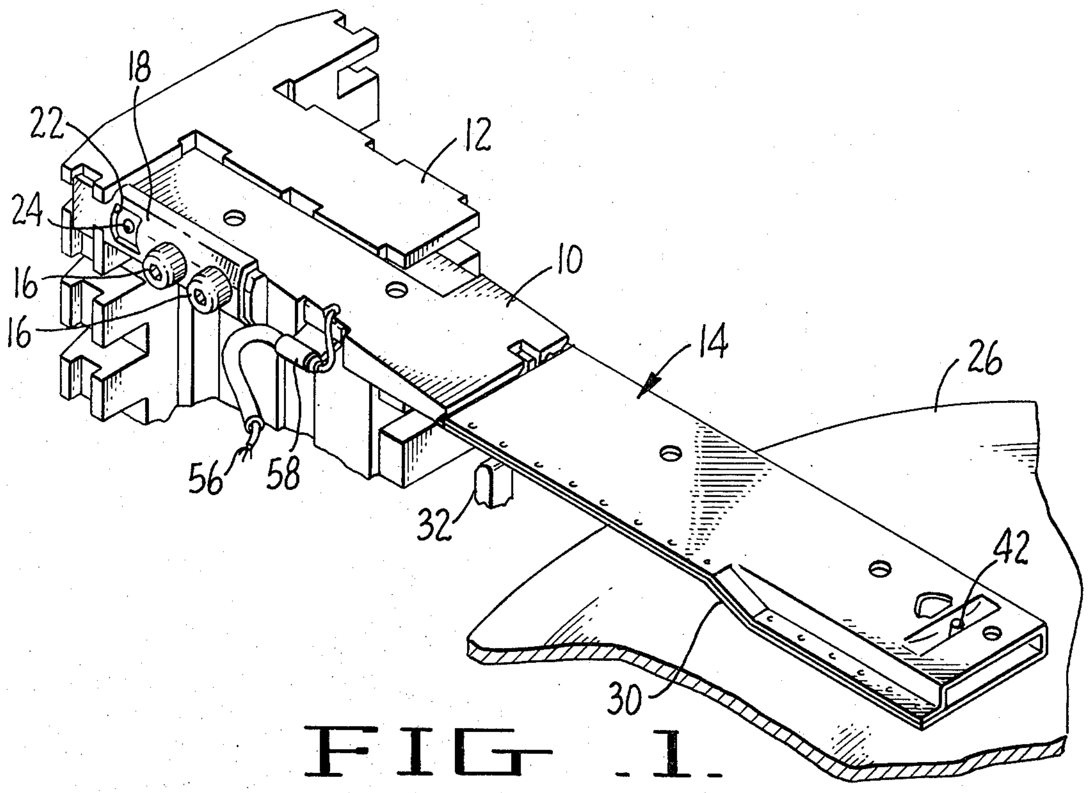
FIG. 1 is a perspective view of the rigid mount and an arm assembly connected to the mount and supported by the mount on a tee block and over a recording disk which are shown partially fragmented.

Referring to the perspective view of FIG. 1, the improved rigid mount 10 is shown mounted to a tee block 12 which is used to support a plurality of arm assemblies on an accessing carriage in a disk drive machine of the general type described in U.S. Pat. No. 3,544,980, issued Dec. 1, 1970 to R.A. Applequist et al. The rigid mount 10 is shown connected to an arm assembly 14 preferably of the type described in the application of Ronald W. Higgins and Donald J. Massaro, filed Oct. 24, 1972, bearing Ser. No. 300,274.

The rigid mount 10 is fastened against the tee block 12 by two allen screws 16 which are secured against an alignment clip 18 which is placed against a beveled edge 20 of the mount to prevent the mount from undesired movement from the torsional action of the screws when tightened. The clip 18 also permits the mount to be adjusted by movement of the mount with respect to the clip through opening 22. A tool (not shown) having an excentrically supported pin can be inserted into a hole 24 in the mount and cammed against the clip opening to permit small adjustments to the mount 10 and connected arm assembly for proper orientation of a recording transducer with respect to a recording disk format.

Figure 2:
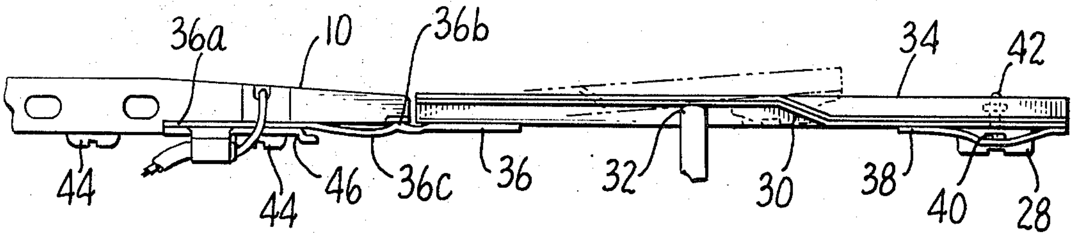
FIG. 2 is a side elevational view of the mount and connected arm assembly of FIG. 1.

The arm assembly 14 in FIG. 1 is positioned over a recording disk 26 such that a recording transducer or head (not visible) is mounted in an aerodynamic slider on the underside of the arm assembly which rides on an air bearing layer created by the disk when rotating at high angular velocities. The location of the slider 28 on the arm assembly 14 is shown in FIG. 2. The arm assembly includes, along one edge, a ramp 30 which cooperates with a stationary cam 32 attached to a cam support (not shown) to lift the arm assembly and head from the disk when the tee block and attached arm assembly are linearly retracted from the disk. The cam 32, which does not contact the edge of the arm assembly when the slider is loaded on the disk, contacts the ramp 30 as the arm assembly is retracted, forcing the arm assembly to ride up on the cam as shown in phantom in FIG. 2, thereby elevating the slider from the disk. Loading is accomplished in the reverse manner with the arm assembly riding down the cam as the assembly is advanced toward the center of the disk thereby lowering the slider onto the disk.

The elements of the arm assembly are shown with greater clarity in the elevational view of FIG. 2 to illustrate the arrangement of the slider 28 in the arm assembly. The arm assembly includes a tubular member 34 cantilevered from a load spring 36 which is a broad leaf spring spot welded to the tubular cantilevered member. At the distal end of the cantilevered member 34 is a flat, rectangular, frame-like flexure 38. The flexure is also fabricated from a leaf spring material and is fixed at three points to the cantilevered member and at two points to weld lugs 40 protruding from opposite sides of the slider. The preferred design of the flexure is described in greater detail in the application of Herbert E. Thompson, entitled "Recording Head Flexure," filed on Oct. 24, 1972 bearing Ser. No. 300,273.

The slider 28 is centrally positioned on a load button 42 which transmits the loading bias from the leaf spring through the cantilevered member to the slider. The load button 42 is seated in a small hole in the cantilevered member 34 and operates in cooperation with the flexure 33 to provide a degree of pitch and roll to the slider to permit the slider to conform to surface imperfections in the surface of a recording disk.

The load spring 36 of the arm assembly is fastened to the rigid mount 10 by two screws 44 which secure a cover plate 46 against the load spring to clamp the end portion **36*a* of the spring flat against the mount. To obtain a substantial load bias, the load spring is bent to the static configuration shown in the exploded view of FIG. 3. In the loaded position of the arm, the load spring is deformed in the manner shown in FIG. 2. The bend 36*b* provides the fulcrum point for the cantilevered member and is located adjacent the end edge of the mount. The cover plate 46 is displaced from the end of the mount to permit a portion 36*c*** of the load spring to bow and thereby distribute some of the load flexure along the spring.

It is this deformation which creates the anticlastic curvature at the contact and causes the contact point to shift along the edge of a mount. As noted hereinbefore, a shift in the contact point shifts the resonances of the arm and may cause the resonance in the arm to become consonant with resonance of the disk. The inter excitation of matched consonant resonances has substantially adverse effects on the performance of a disk recording machine and is to be avoided.

This is accomplished by restricting the contact surface to a localized point that is formed by routing the end edge of the rigid mount except for a narrow ridge.

Figure 3:
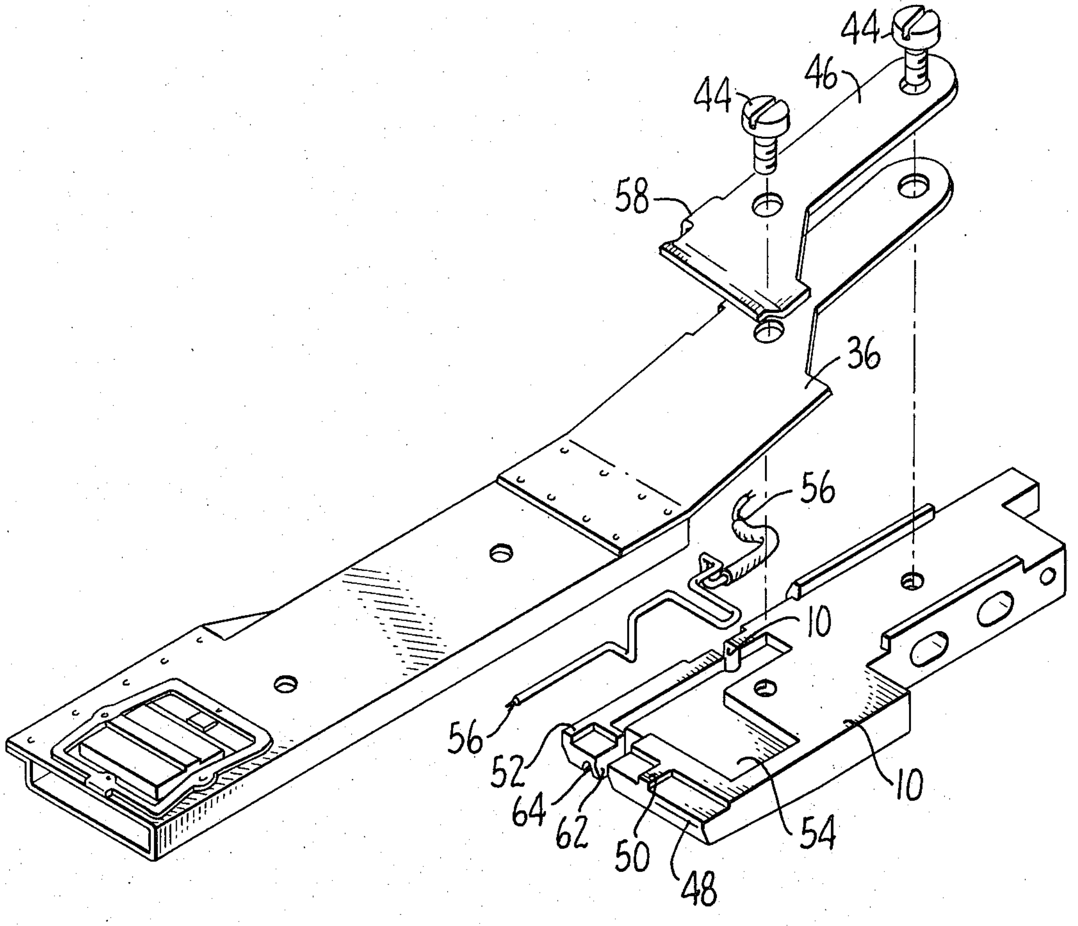
FIG. 3 is an exploded view of the mount and arm assembly of FIG. 2.
Figure 4:
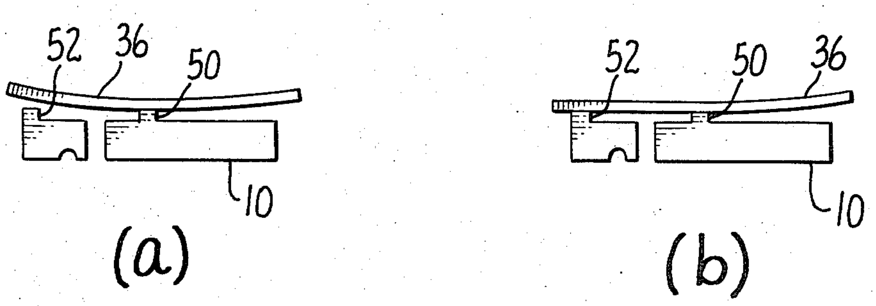
FIG. 4 (a) and (b), is a schematic illustration of the mount and a load spring in the arm assembly in both the loaded and unloaded condition, respectively, of the arm assembly on a disk (not shown).

With reference to the exploded view of FIG. 3, the contact surface of the rigid mount 10 is visible. As shown the end edge 48 is routed except for a central ridge 50 and an edge ridge 52. The central ridge, as noted, localizes the contact point of the load spring when the arm assembly is loaded on the disk. The edge ridge 52 is, however, included to provide a stop for arm assembly twist caused by the imbalanced unload condition where the stationary cam supports the arm at its edge. The stop is substantially at the same height as the central contact point 50. When the end edge is so constructed and arranged, the spring makes an initial contact on the mount as schematically illustrated in FIG. 4, (a) and (b). In FIG. 4 (a), the initial contact point for an arm assembly that is loaded on a disk is shown. The load spring 36 of the arm assembly 14 is shown contacting contact point 50 which is located approximately at the center of mount 10. The preferred point of location is determined by the centroidal axis of the arm assembly when loaded on a disk where the dynamic moments about the axis during ideal operation are balanced. Since the loading force is transmitted to the slider by an isolated point at the load button, one point defining the centroidal axis comprises this load point. Contact point 50 can be experimentally determined with reference to the load button point.

The anticlastic curvature of the load spring 36 shown in FIG. 4 (a) is slightly exaggerated for emphasis. The apparent nonuniformity of the curve is representative of the actual curve which is determined by the off-center position of the slider at the end of the arm. During operation the load spring remains on the single contact point. Torsional forces arising at the end of the arm cause the arm assembly to pivot on the contact point 50 until the forces are absorbed and relieved by the normal reactance of the wide load spring.

Referring to FIG. 4 (b), the load spring 36 contacts the rigid mount 10 at both contact point 50 and 52, respectively, when the arm assembly is in the unload position and resting on a cam contacting the side of the arm assembly. The imbalanced unload arrangement tends to twist the arm assembly and load spring against the contact point 52. The contact point 52 thus provides a stop, to maintain the arm assembly substantially level and prevent any permanent deformation in the arm assembly from developing from repeated unrestrained twist during unloading.

Other features in the preferred embodiment of the mount are shown in the exploded view of FIG. 3. In addition to routing the end edge 48 of the mount, a central portion 54 is routed to provide for storage of a service loop of lead wires to the recording transducer in the slider. With reference also to FIG. 1, three conductor wires 56 are supplied from a point on a disk drive machine (not shown) to the arm assembly at clip 58 on the cover clamp 46. The wires enter the arm assembly through notch 60 in the mount 10 shown in FIG. 3. After looping in the central portion 54 of the mount, the wires pass from the mount to the tubular cantilevered member through exit notch 62 and channel 64. The channel 64 is a right angle channel connected to the notch 62 which insures that the wires are well removed from the interface of the mount and load spring where they might otherwise become entangled. The wires are connected to the recording transducer from inside the protective tubular construction of the cantilevered member and electrically connect the transducer to the control and information transfer circuitry of a drive machine.

I claim:

1. An improved mount connecting a leaf spring type arm assembly to an accessing mechanism in a disk drive machine for restricting the resonance of vibrations in the arm assembly wherein the improvement comprises the combination of a rigid mount member connectable to an accessing mechanism and a flat leaf spring fixed to a cantilevered member in an arm assembly which supports a recording transducer, wherein, said mount member has a substantially flat face against which a portion of said leaf spring is secured and an end edge from which said leaf spring is cantilevered, said end edge having a localized contact point between said leaf spring and said mount which contacts said leaf spring substantially on the centroidal axis of the arm assembly.

2. The improved mount of claim 1 wherein the arm assembly is of a cam-ramp loading type having a ramp on one edge of the cantilevered member which is engageable with a stationary cam for displacing the arm assembly and wherein said mount member has further a second localized contact point (elevated from the remaining edge between said leaf spring and said mount) and is so constructed and arranged that the edge of the leaf spring on the side of the arm assembly on which the ramp is arranged contacts said contact point when said ramp engages the stationary cam, thereby restricting the arm assembly from twisting.

3. A method of restricting the resonance of vibrations in a leaf spring arm assembly for a disk recorder machine caused by variations in the contact interface between a rigid mount and a leaf spring on an arm assembly cantilevered from the mount comprising the step of cantilevering the leaf spring of the arm assembly from a localized contact point between the leaf spring and the rigid mount thereby restricting the contact interface to an isolated point.

4. The method of claim 3 wherein the contact point is substantially on the centroidal axis of the arm assembly.

* * * * *